United States Patent

[11] 3,541,915

| [72] | Inventor | Harold B. Rhodes<br>Anaheim, California |
| [21] | Appl. No. | 759,272 |
| [22] | Filed | Sept. 12, 1968 |
| [45] | Patented | Nov. 24, 1970 |
| [73] | Assignee | Columbia Broadcasting System Inc.<br>New York, New York<br>a corporation of New York |

[54] PLURAL ELECTRONIC MUSICAL INSTRUMENTS FOR TEACHING
7 Claims, 1 Drawing Fig.

[52] U.S. Cl..................................................... 84/470,
84/1.01
[51] Int. Cl........................................................G09b 15/00,
G10h 1/00
[50] Field of Search......................................... 84/1.01,
1.04, 1.08, 1.17, 470, 477, 478; 35/6, 8

[56] References Cited
UNITED STATES PATENTS
| 3,353,435 | 11/1967 | Schmoyer..................... | 84/478 |
| 3,470,785 | 10/1969 | Shallenberger et al. ...... | 84/470 |

*Primary Examiner*—Warren E. Ray
*Assistant Examiner*—Stanley J. Witkowski
*Attorney*—Gausewitz & Carr

ABSTRACT: A school system for teaching piano, guitar, etc., and wherein a musical instrument is provided for each of the students and for the instructor. Each piano (or other instrument) is supplied with a microphone, a metronome, amplification means and electro-acoustic transducer means, in addition to the signal means which are responsive to the musical tones being generated. Switching and circuit means are provided to connect the instructor's piano with each individual student piano, or with various groups of student pianos, and also to connect selected ones of student pianos with each other for ensemble play or communication. Such switching and circuit means permit the instructor to deliver the sound generated by his metronome to the individual students, so that a "master metronome" effect is provided whereby all (or a group) of the students may play at the same speed in ensemble. Switching means are also provided to permit the instructor to transmit his voice to all students simultaneously, and also to prevent the students from transmitting sounds to the instructor or to each other, whereby the instructor may have the full attention of the class for group instruction or for fire drill purposes.

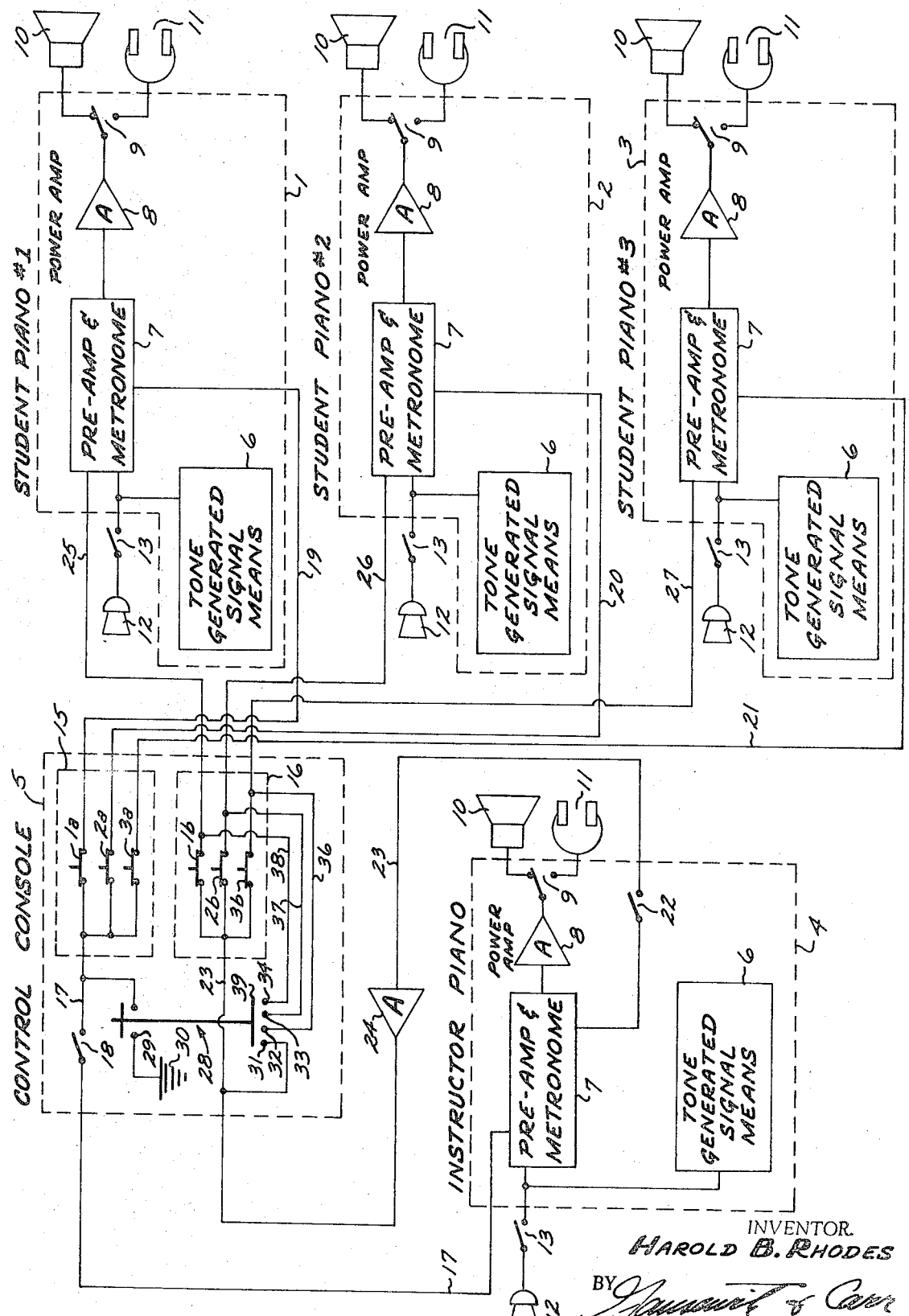

3,541,915

PLURAL ELECTRONIC MUSICAL INSTRUMENTS FOR TEACHING

BACKGROUND OF THE INVENTION

1. Field of the Invention

This invention relates to the field of the teaching of piano, guitar, or other musical instruments.

2. Description of the Prior Art

Electrical systems for teaching piano and other musical instruments have previously been known, for example as taught by U.S. Pat. Nos. 1,696,901; 2,927,492; 3,165,967; and 3,001,431. However, such systems have not heretofore incorporated any simple, economical and feasible means for effecting adequate communication between various groups of students for permitting the instructor to transmit a metronome sound to any desired group of students, and for permitting the instructor to talk simultaneously to all students while insuring that no student interferes with such talk.

SUMMARY OF THE INVENTION

The present invention provides selective two-way communication between the instructor and any student, and between different students, and in addition employs the circuitry necessary for such two-way communication in order to achieve several important functions. One such function is to permit the instructor to deliver a metronome signal to any selected group of student pianos, in order that such pianos may play in ensemble with each other. In addition, the instructor may, by actuating a "master-talk" switch, extend his voice to every student in the room and simultaneously prevent students from interfering with the instructional or emergency directions being given by the instructor.

BRIEF DESCRIPTION OF THE DRAWING

The single FIG. drawing comprises a schematic representation of a musical instrument school system incorporating the present invention.

DESCRIPTION OF THE PREFERRED EMBODIMENT

The invention will be described in connection with electric pianos, but (as indicated above) it may also be employed in connection with teaching the playing of guitars, organs, wind instruments, etc. Only four electric pianos are shown in the single FIG. drawing, one for the instructor and three for students, but it is to be understood that in a typical situation there are about 10, 20, 30 or more electric pianos for the students. For such multiple-student situations, the circuitry and operation are the same, it being merely necessary to multiply the number of circuits shown in the drawing.

Three student pianos are illustrated, being respectively numbered 1, 2 and 3. There is also illustrated an instructor piano 4 which is located adjacent a control console 5. Thus, the instructor seated at piano 4 may conveniently operate the switches incorporated in such piano, and may also operate any of the switches on the control console.

Each electric piano 1—4 may be, for example, the type described and claimed in my U.S. Pat. No. 2,972,922, issued Feb. 28, 1961, for Electrical Musical Instrument in the Nature of a Piano. The coils or other sensing devices (or tone-generating devices) incorporated in the piano are represented at 6 in each of the pianos 1—4. The sensing or tone-generating elements 6 respond to striking of the piano keys and deliver corresponding signals to preamplifiers 7, power amplifiers 8 and thus to suitable electroacoustic transducer means. More specifically, the amplified signals emanating from power amplifiers 8 pass through selector switches 9 either to loudspeakers 10 or to headphones 11, depending upon the desires of the particular instructor or student.

Each piano 1—4 additionally includes a microphone 12 which is connected through a switch 13 with an input of preamplifier 7. The microphones 12 are employed, when switches 13 are closed and other switches (described hereinafter) are properly adjusted, to permit two-way communication between the instructor piano 4 and any one of the student pianos 1—3, or between various ones of the student pianos.

Each of the preamplifiers 7 incorporates therein (or in association therewith) suitable metronome circuitry, for example in the form of a unijunction transistor relaxation oscillator. Other suitable metronome circuits are described in U.S. Pat. Nos. 3,271,670 and 3,093,914. Control means, not shown, are provided to permit each student (and the instructor) to determine the rate of generation of the metronome sounds, and also to permit the metronomes to be turned off when desired. Other control means (not shown) permit each student and the instructor to determine the level of the sound generated by the associated loudspeaker 10 or headset 11.

The control console 5 incorporates switching means to control communication between the instructor piano 4 and various ones of the student pianos 1—3. Thus, a first switch group, numbered 15, incorporates three switches 1a, 2a and 3a which are respectively associated with the three student pianos 1, 2 and 3. The switch group 15 controls communication of signals passing from the student microphones 12 (pianos 1—3) to the instructor headphones 11 or loudspeaker 10 (piano 4). A second switch group 16 incorporated in control console 5 includes switches 1b, 2b and 3b. These switches are adapted to control transmission of signals from the instructor microphone 12 (piano 4) to selected ones of the student pianos 1—3 (normally to the headphones 11 of such pianos).

An input of the instructor's preamplifier 7 (piano number 4) is connected through a lead 17 and switch 18 to one side of each of the switches 1a, 2a and 3a in group 15 thereof. The other side of switch 1a is connected through a lead 19 to an output of preamplifier 7 in student piano number 1. Correspondingly, leads 20 and 21 connect the remaining sides of switches 2a and 3a to outputs of preamplifiers 7 in student pianos 2 and 3.

An output of the instructor's preamplifier 7 (piano number 4) is connected through a switch 22, lead 23 and amplifier 24 to one side of each of the switches 1b, 2b and 3b in switch group 16. The other side of switch 1b is connected through a lead 25 to an input of student preamplifier 7 (piano number 1). Correspondingly, the remaining sides of switches 2b and 3b are connected through leads 26 and 27 to inputs of preamplifiers 7 of the respective student pianos 2 and 3.

There is also incorporated in control console 5 a "master-talk" switch 28. Such switch has a first set of contacts 29 adapted when closed to connect a circuit from lead 17 to ground (indicated at 30). Thus, when contacts 29 are closed no signal may pass from any student piano 1—3 to the instructor piano 4. It is pointed out that suitable ground connections, not shown, are provided in association with numerous ones of the above-indicated components of the system as is well known in the art. Such ground connections have been omitted, for purposes of simplicity of illustration and description, except in the case of ground 30 which is adapted (as stated above) to prevent passage of voice or music signals through lead 17 to the instructor.

Other sets of contacts of the "master-talk" switch 28 are adapted to effect simultaneous bypassing or shunting of the switches 1b, 2b and 3b in switch group 16. In the illustrated schematic representation, four contact points 31—34 are shown, the first such point being connected to lead 23. Contact 32 is connected through lead 36 with lead 27; contact 33 is connected through lead 37 to lead 26; and contact 34 is connected through lead 38 to lead 25. When contacts 31—34 are simultaneously engaged by an electrically-conductive element represented schematically at 39, and which occurs concurrently with the closing of contacts 29, circuits are connected from lead 23 simultaneously through all of leads 36—38 to leads 25—27.

OPERATION

Let it be assumed that each of the microphone switches 13 is closed, that each of the selector switches 9 is set to such position that a signal is delivered from each power amplifier 8 to the associated headset 11, that switches 18 and 22 are closed, and that switch 28 is in the open position illustrated. Let it also be assumed that each of the switches 1a, 2a, 3a, 1b, 2b and 3b is initially open, the movable element thereof being spaced upwardly from the fixed contacts.

Each student may then play his piano independently of each other piano, causing signals to be generated in his particular tone-generator means 6 and amplified in amplifiers 7 and 8 for transmission to headset 11, so that each student hears his own piano and none other. When thus playing his own piano independently of all others, each pianist may adjust the metronome control of his preamplifier and metronome 7, and may adjust the volume control of his preamplifier 7, in order to determine the repetition rate of the metronome signal and also the volume of the signal transmitted to the headset 11.

When the instructor desires to monitor the playing of a particular student, he closes the switch in group 15 and which is associated with the student piano to be monitored. For example, if the instructor desires to listen to piano number 2, he closes switch 2a and thus completes the circuit from preamplifier 7 of piano 2 through lead 20, switch 2a, lead 17, switch 18, preamplifier 7 of piano 4, amplifier 8 and switch 9 to headset 11 of piano 4.

Correspondingly, a circuit may be completed from any student piano to the instructor's headset when a student desires to speak to the instructor, for example to ask a question. For this purpose, the student (for example the one at student piano number 2) operates a suitable signal means (not shown) to indicate to the instructor that he wishes to communicate with him. The instructor then closes switch 2a to complete the above-described circuit and permit the student at piano 2 to speak into his microphone 12 and cause a corresponding voice signal to be generated at headset 11 of piano 4.

When the instructor desires to speak to any student, he closes the switch in group 16 associated with the piano at which the student is seated. For example, if the instructor wishes to speak to the student at piano number 2, he closes switch 2b and thus completes a circuit from microphone 12 of instructor piano 4 through switch 13, preamplifier 7 of piano 4, switch 22, lead 23, amplifier 24, switch 2b, lead 26, preamplifier 7 of piano 2, amplifier 8, and selector switch 9 to headset 11 of piano 2. Two-way communication is thus possible at all times, and under the full control of the instructor. The signalling means, which the student can use in order to request that the instructor make the connection may be (for example) a flashing light in the control console 5 and which is operated by a suitable switch at each piano, there being one separate flashing light for each of the student pianos.

During the above-indicated voice transmission between the instructor and any student, or any group of students, the instructor and students will normally turn off the metronome portions of their preamplifiers 7.

Let it next be assumed that the instructor wishes to cause all of the students (and the instructor also, if desired) to hear the same metronome signal so that all may play together. To accomplish this, the instructor first instructs each student to turn off his metronome, following which the instructor turns on his metronome (piano number 4) and closes the switches 1b, 2b and 3b. The metronome signal is thus transmitted from preamplifier 7 of piano 4 through the switch 22, lead 23, amplifier 24, all of switches 1b, 2b and 3b, and leads 25—27 to the amplification means and headsets of all student pianos 1—3. All of the student pianists will then play together at the same speed, under control of what may be termed the master metronome, namely, the metronome portion of the instructor's preamplifier 7 (piano 4).

Before instructing the students as indicated above, the instructor normally closes the master-talk switch 28. This operates, as described heretofore, to bypass all of the switches 1b, 2b and 3b and make it possible for the instructor to cause his voice to pass through lead 23, amplifier 24, leads 36—38 and leads 25—27 to the amplification means and headsets of all student pianos 1—3. Such bypassing of the switch means 16 in control console 5 is important, particularly when it is remembered that there may be 30 or 40 such switches instead of merely the three shown at 1b, 2b and 3b. Not only are the switches 1b —3b bypassed, but the closing of contacts 29 of the master-talk switch 28 operates to ground all signals in lead 17, such signals passing to ground 30 instead of passing back to the input of the instructor's preamplifier 7 (piano 4). It follows that regardless of the open or closed condition of the switches in group 15, namely, switches 1a, 2a, 3a or any others of the many other switches (not shown) in such group, there will be no music or voice signal transmitted back to the instructor or to other students with consequent distractive competition with the instructor's voice.

When the instructor desires that each pianist be able to listen to each other pianist, he closes all of the switches in both groups 15 and 16. Then, not only can the various students listen to voice and musical signals passing from the instructor piano 4 to any student piano through lead 23, but the instructor can listen to voice and musical signals passing from any student piano 1—3 through leads 19—21 and lead 17 back to the instructor preamplifier 7 (piano 4). In addition, the signals thus transmitted from the student pianos back through lead 17 to instructor preamplifier 7 (piano 4) are passed through such preamplifier 7 and lead 23 back to the various student pianos. It follows that the individual students may then hear each other as well as hearing the instructor.

During such periods when all pianos are interconnected, the instructor causes each student to turn off the metronome portion of his preamplifier 7 so that the only metronome heard is the one in the instructor's preamplifier 7 (piano 4). Also, during such periods, the instructor normally instructs the students to open their microphone switches 13 so that microphones 12 of the student pianos 1—3 are disconnected.

At any time, the instructor can speak (without distraction) to all students by merely shifting the master-talk switch 28 from the illustrated open position to the closed position described above. During such periods, the students hear the instructor (speech and/or music) but the instructor cannot hear the students (neither speech nor music). Furthermore, the students cannot then hear each other, but only the instructor.

Let it next be assumed that the instructor desires to cause pianos number 1 and 3, for example, to play in duet. He then closes switches 1a, 3a, 1b and 3b, but leaves switches 2a and 2b open. It follows that student pianos number 1 and 3 are in communication with the instructor and also with each other, as described above, but that student piano number 2 is not in communication with the others and may therefore be operated independently by the student thereat. Correspondingly, and in the actual situation where there are normally 10, 20 or 30 pianos, various groups of pianos may be connected together and to the instructor as desired.

Should the instructor desire that his voice and music signal not be transmitted to the students, he merely opens switch 22 in lead 23 (thus eliminating the necessity of opening all of the numerous switches in group 16). Correspondingly, should the instructor desire to prevent transmission of signals from the student pianos 1—3 back to the instructor, during periods when the "master-talk" switch 28 is in the open position illustrated, he merely opens switch 18 in lead 17.

It will thus be seen that the present relatively simple circuit provides a multiplicity of functions, including full two-way communication, individual and master-metronome operations, master-talk operation, and ensemble play. This gives the instructor full control over the situation and permits various students to play in duet and/or ensemble.

I claim:

1. A school system for musical instructions, which comprises:

a substantial number of electrical musical instruments each incorporating means to generate electrical musical signals corresponding to the musical notes being played by the musician, one of said instruments being an instructor instrument adapted to be played by the instructor, the remainder of said instruments being student instruments adapted to be played by various students, each of said instruments having associated therewith a metronome means adapted to generate electrical metronome signals, each of said instruments also having associated therewith a microphone for generation of electrical voice signals, each of said instruments also having associated therewith electroacoustic transducer means for conversion of metronome signals, musical signals and voice signals into sound waves, each of said instruments incorporating circuit and amplification means for connecting said musical signal generation means and said metronome signal generation means to said electroacoustic transducer means;

circuit means connecting said instructor instrument to all of said student instruments for controlled transmission of electrical musical signals and voice signals therebetween, and for controlled transmission of metronome signals from said instructor instrument to said student instruments, and switching means provided adjacent said instructor instrument to control transmission of signals through said last-mentioned circuit means, said switching means being operable to positions such that the instructor is in two-way voice communication with any student, and with any desired group of students, said switching means also being operable to positions such that the instructor may monitor the playing of any student and any desired group of students, said switching means also being operable to positions such that the instructor may transmit electrical metronome signals from the metronome means for the instructor instrument to any student and any desired group of students, whereby any desired group of students may play in ensemble at a rate determined with the instructor instrument.

2. The invention as claimed in claim 1, in which a second switching means is provided and is adapted when in a first position to bypass said first-mentioned switching means and connect the microphone for the instructor instrument simultaneously to the electroacoustic transducer means for each of said student instruments.

3. The invention as claimed in claim 2, in which said second switching means further incorporates means to prevent transmission of electrical signals from any student to the instructor during periods when said second switching means is in said first position.

4. The invention as claimed in claim 3, in which said means to prevent transmission of signals is a means to connect to ground, during periods when said second switching means is in said first position, the portion of said second-mentioned circuit means carrying signals from the student instruments to the instructor instrument.

5. The invention as claimed in claim 1, in which said second-mentioned circuit means and said switching means are adapted, when said switching means is in a predetermined switching position, to connect together a plurality of student instruments whereby the students playing such instruments may hear each other and play in ensemble.

6. The invention as claimed in claim 1, in which said instruments are electric pianos.

7. The invention as claimed in claim 1, in which at least the portion of said second-mentioned circuit means connecting said instructor instrument to all of said student instruments incorporates amplification means therein.

PO-1050
(5/69)

UNITED STATES PATENT OFFICE
CERTIFICATE OF CORRECTION

Patent No. 3,541,915      Dated November 24, 1970

Inventor(s)    Harold B. Rhodes

It is certified that error appears in the above-identified patent and that said Letters Patent are hereby corrected as shown below:

Column 6, line 7, after "determined" insert --- by the metronome means associated ---. Thus, lines 6, 7 and 8 of column 6 should read:
---    whereby any desired group of students may play in ensemble at a rate determined by the metronome means associated with the instructor instrument. ---.

Signed and sealed this 10th day of August 1971.

(SEAL)
Attest:

EDWARD M. FLETCHER, JR.      WILLIAM E. SCHUYLER, JR.
Attesting Officer               Commissioner of Patents